(12) United States Patent
Cui et al.

(10) Patent No.: US 12,280,518 B2
(45) Date of Patent: Apr. 22, 2025

(54) WOOD TEMPLATE-SUPPORTED PHASE CHANGE COMPOSITE FOR THERMAL ENERGY APPLICATIONS

(71) Applicants: Alliance for Sustainable Energy, LLC, Golden, CO (US); Board of Regents, The University of Texas System, Austin, TX (US)

(72) Inventors: Shuang Cui, Dallas, TX (US); Charles William Booten, Arvada, CO (US); Judith Cecilia Vidal, Littleton, CO (US); Yudong Li, Golden, CO (US); Kyle Edward O'Neil Foster, Denver, CO (US); Xiaowen Chen, Arvada, CO (US); Kelsey Mary Lynch, Denver, CO (US); Hongbing Lu, Plano, TX (US); Bernadette Karen Magalindan, Dallas, TX (US); Gustavo Felicio Perruci, Richardson, TX (US)

(73) Assignees: Alliance for Sustainable Energy, LLC, Golden, CO (US); Board of Regents, The University of Texas System, Austin, TX (US)

( * ) Notice: Subject to any disclaimer, the term of this patent is extended or adjusted under 35 U.S.C. 154(b) by 301 days.

(21) Appl. No.: 17/936,925

(22) Filed: Sep. 30, 2022

(65) Prior Publication Data
US 2023/0111862 A1    Apr. 13, 2023

Related U.S. Application Data

(60) Provisional application No. 63/250,427, filed on Sep. 30, 2021.

(51) Int. Cl.
*B27K 3/02* (2006.01)
*B27K 3/15* (2006.01)
(Continued)

(52) U.S. Cl.
CPC .............. *B27K 3/0207* (2013.01); *B27K 3/15* (2013.01); *B27K 5/001* (2013.01); *B27K 5/007* (2013.01);
(Continued)

(58) Field of Classification Search
CPC ............ B27K 2240/10; B27K 2240/60; F28D 20/023; F28D 2020/0017
See application file for complete search history.

(56) References Cited

U.S. PATENT DOCUMENTS

| | | |
|---|---|---|
| 4,419,184 A | 12/1983 | Backlund |
| 4,871,597 A | 10/1989 | Hobson |
| 8,011,151 B2 | 9/2011 | Pollack |

FOREIGN PATENT DOCUMENTS

| | | | |
|---|---|---|---|
| CA | 2 248 178 C | | 11/2002 |
| CN | 104910334 A | * | 9/2015 |

(Continued)

OTHER PUBLICATIONS

Liu et al., "Modification of Poplar Wood via Polyethylene Glycol Impregnation Coupled with Compression," Forests 2022, 13, 1204. (Year: 2022).*

(Continued)

*Primary Examiner* — William P Fletcher, III
(74) *Attorney, Agent, or Firm* — Alexandra M. Hall

(57) ABSTRACT

Wood template-supported phase change material (PCM) composite having thermal energy storage applications. A wood template-supported PCM may include a wood template that has had at least a portion of its xylan and/or lignin removed and saturated with a PCM. The PCM may be stabilized with a cross linkable network for improved infiltration into the wood template. The wood template-supported PCM composite may be formed by extracting xylan and/or lignin from the wood to create a wood template, (Continued)

densifying at least a portion of the wood template, and inserting a PCM into the wood template.

17 Claims, 12 Drawing Sheets

(51) Int. Cl.
    *B27K 5/00*         (2006.01)
    *F28D 20/02*       (2006.01)
    *F28D 20/00*       (2006.01)

(52) U.S. Cl.
    CPC ........ *F28D 20/023* (2013.01); *B27K 2240/10* (2013.01); *B27K 2240/60* (2013.01); *F28D 2020/0017* (2013.01)

(56) References Cited

FOREIGN PATENT DOCUMENTS

| | | |
|---|---|---|
| EP | 2 342 272 B1 | 9/2013 |
| EP | 3 396 063 A1 | 10/2018 |
| WO | 2018/191181 A1 | 10/2018 |
| WO | WO-2019055789 A1 * | 3/2019 ............... B27K 1/00 |

OTHER PUBLICATIONS

Lignin, Polymer Science Dictionary 289 (2d ed. 1997). (Year: 1997).*
Xylan, Polymer Science Dictionary 618-19 (2d ed. 1997). (Year: 1997).*
Barreneche et al., "PCM/wood composite to store thermal energy in passive building envelopes", IOP Conference Series: Materials Science and Engineering, 2017, vol. 251, No. 012111, pp. 1-4.
Dong et al., "Grafting Polyethylene Glycol Dicrylate (PEGDA) to Cell Walls of Poplar Wood in Two Steps for Improving Dimensional Stability and Durability of the Wood Polymer Composite", Holzforschung, 2016, vol. 70, No. 10, pp. 919-926.
Ermeydan et al., "Modification of Spruce Wood by UV-Crosslinked PEG Hydrogels inside Wood Cell Walls", Reactive and Functional Polymers, 2018, vol. 131, pp. 100-106.
Feng et al., "Delignified Bamboo as Skeleton Matrix for Shape-Stable Phase Change Heat Storage Material with Excellent Reversible Thermochromic Response Property", Journal of Energy Storage, Aug. 2020, vol. 30, 101401, pp. 1-10.
Foster et al., "Optical Properties and Mechanical Modeling of Acetylated Transparent Wood Composite Laminates", Materials, 2019, vol. 12, No. 14, 2256, pp. 1-15.
Hill, "Wood Modification: An Update", BioResources, 2011, vol. 6, No. 2, pp. 918-919.
Katunský et al., "Structural elements with transparent wood in architecture", International Review of Applied Sciences and Engineering, 2018, vol. 9, No. 2, pp. 101-106.
Kenisarin et al., "Form-stable phase change materials for thermal energy storage" Renewable and Sustainable Energy Reviews, May 2012, vol. 16, No. 4, pp. 1999-2040.
Li et al., "Fabrication and Properties of Polyethylene Glycol-Modified Wood Composite for Energy Storage andConversion", BioResources, 2016, vol. 11, No. 3, pp. 7790-7802.
Li et al., "Wood Composite as an Energy Efficient Building Material: Guided Sunlight Transmittance and Effective Thermal Insulation", 2016, Advanced Energy Materials, vol. 6, No. 22, 1601122, pp. 1-7.
Li et al., "Lignin-Retaining Transparent Wood", ChemSusChem, 2017, vol. 10, No. 17, pp. 3445-3451.
Li et al., "Towards centimeter thick transparent wood through interface manipulation", Journal of Materials Chemistry A, 2018, vol. 6, No. 3, pp. 1094-1101.
Lin et al., "Fabrication of Thermal Energy Storage Wood Based on Graphene Aerogel Encapsulated Polyethylene Glycol as Phase", Materials Research Express, 2020, vol. 7, No. 9, 095503, pp. 1-10.
Ma et al., "Delignified Wood/Capric Acid-Palmitic Acid Mixture Stable-Form Phase Change Material for Thermal Storage", Solar Energy Materials and Solar Cells, 2019, vol. 194, pp. 215-221.
Mathis et al., "Impregnation of Wood with MicroencapsulatedBio-Based Phase Change Materials for High Thermal Mass Engineered Wood Flooring", Applied Sciences, 2018, vol. 8, No. 2696, pp. 1-14.
Meng et al., "Form-stable phase change materials from mesoporous balsa after selective removal of lignin", Composites Part B, 2020, pp. 1-11.
Montanari et al., "Transparent Wood for Thermal Energy Storage and Reversible Optical Transmittance", ACS Applied Materials & Interfaces, 2019, vol. 11, No. 22, pp. 20465-20472.
Pereira da Cunha et al., "Thermal energy storage for low and medium temperature applications using phase change materials—A review", Applied Energy, 2016, vol. 177, pp. 227-238.
Navi et al., "Effects of Thermo-Hydro-Mechanical Treatment on theStructure and Properties of Wood", Holzforschung, 2000, vol. 54, No. 3, pp. 287-293.
Qiu et al., "Transparent wood with thermo-reversible optical properties based on phase-change material", Composites Science and Technology, Nov. 2020, vol. 200, 108407, pp. 1-7.
Rautkari et al., "Hardness and density profile of surface densified and thermally modified Scots pine in relation to degree of densification", Journal of Materials Science, 2013, vol. 48, pp. 2370-2375.
Song et al., "Processing bulk natural wood into a high-performance structural material", Nature, Feb. 2018, vol. 554, pp. 224-239.
Stamm, "Effect of Polyethylene Glycol on the Dimensional Stability of Wood", Forest Products Journal, 1959, vol. 9, No. 10, pp. 375-381.
Vasco et al., "Kinematic characterization of the pressure-dependent PCM impregnation process for radiata pine wood samples", European Journal of Wood and Wood Products, 2018, vol. 76, pp. 1461-1469.
Wang et al., "A thermal energy storage composite by incorporating microencapsulated phase changematerial into wood", RSC Advances, 2020, vol. 10, pp. 8097-8103.
Xia et al., "Transparent wood with phase change heat storage as novel green energy storage composites for building energy conservation", Journal of Cleaner Production, 2021, vol. 296, No. 126598, pp. 1-9.
Yang et al., "Composite phase change materials with good reversible thermochromic ability in delignified wood substrate for thermal energy storage", Applied Energy, 2018, Vo. 212, pp. 455-464.
Yang et al., "Preparation of Porous Carbonized Woods Impregnated with Lauric Acid as Shape-Stable Composite Phase Change Materials", Applied Thermal Engineering, 2019, vol. 150, pp. 967-976.
Yang et al., "Wood-based composite phase change materials with self-cleaning superhydrophobic surface for thermal energy storage", Applied Energy, 2020, vol. 261, No. 114481, pp. 1-8.
Yang et al., "Full-Wood Photoluminescent and Photothermic Materials for Thermal Energy Storage" Chemical Engineering Journal, Jan. 2021, vol. 403, 126406, pp. 1-7.
Zhu et al., "Highly Anisotropic, Highly Transparent Wood Composites", Advanced Materials, 2016, vol. 28, No. 26, pp. 5181-5187.
Zhu et al., "Transparent and haze wood composites for highly efficient broadband light management in solar cells", Nano Energy, 2016, vol. 26, pp. 332-339.

* cited by examiner

WOOD TEMPLATE-SUPPORTED PHASE CHANGE COMPOSITE FOR THERMAL ENERGY APPLICATIONS

CROSS-REFERENCE TO RELATED APPLICATIONS

This application claims the benefit of U.S. Provisional Application No. 63/250,427 filed on Sep. 30, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Approximately 10% of total U.S. energy consumption in 2020 was attributed to interior space cooling in the commercial and residential building sectors. With looming effects of climate change, it is crucial to develop technologies that reduce energy inputs for interior thermal regulation by limiting daily thermal fluctuations in buildings. Thermal energy storage (TES), applied to indoor thermal regulation, is a promising technology where heat can be stored and released over a narrow range of temperatures to aid in maintaining thermal comfort with limited additional energy inputs. One class of TES materials, known as phase change materials (PCMs), rely on latent heats of phase transitions to store thermal energy. However, advanced TES technologies are still underutilized, due to difficulties with incorporating PCMs into building materials. PCMs can leak, or the composite containing the PCM may be weaker than traditional building materials. Therefore, there remains a need to incorporate PCMs into building materials that are cost effective and remain structurally sound.

SUMMARY

An aspect of the present disclosure is a method of forming a wood template-supported phase change composite, the method includes extracting a xylan from a wood, resulting in a wood template, densifying at least a portion of the wood template, and inserting a phase change material into the wood template. In some embodiments, the extracting includes soaking at least a portion of the wood in a first solution, removing the wood from the first solution, applying a heat and a pressure to the wood, and washing the wood with a second solution. In some embodiments, the first solution includes water, and the second solution includes at least one of water or methanol. In some embodiments, the heat is in the range of about 100° F. to about 250° F. In some embodiments, the heat is in the range of about 140° F. to about 190° F. In some embodiments, the densifying includes wetting at least a portion of the wood template and compressing the wood template. In some embodiments, the wetting includes soaking the at least a portion of the wood template in water. In some embodiments, the compressing includes positioning a first plate on a first side of the wood template, positioning a second plate on a second side of the wood template, and applying a pressure the wood template through the first plate and the second plate. In some embodiments, the pressure includes a displacement rate of approximately 1 mm/min. In some embodiments, the inserting includes soaking the wood template in a solution including the phase change material and a stabilizing agent. In some embodiments, the phase change material includes a material that can absorb or release heat when changing phase. In some embodiments, the phase change material and the stabilizing agent are cross-linkable (i.e., connected via a covalent bond). In some embodiments, the phase change material includes polyethylene glycol and the stabilizing agent includes poly(ethylene glycol) diacrylate. In some embodiments, the wood includes at least one of pine, balsa, cedar, spruce, firwood, hemlock timber, teak wood, oak, maple, cherry, walnut, beech, mahogany, mango wood, sal wood, or ash. In some embodiments, the method includes using the wood-template supported phase change composite for thermal energy storage.

An aspect of the present disclosure is a wood template-supported phase change composite device including a wood template and a phase change material and a stabilizing agent inserted in the wood template, in which the wood template includes a wood that has had a xylan removed and at least a portion of the wood template is densified. In some embodiments, the phase change material includes a material that can absorb or release heat when changing phase. In some embodiments, the phase change material and the stabilizing agent are cross-linkable (i.e., connected via a covalent bond). In some embodiments, the phase change material includes polyethylene glycol and the stabilizing agent includes polyethylene glycol) diacrylate. In some embodiments, the wood includes at least one of pine, balsa, cedar, spruce, firwood, hemlock timber, teak wood, oak, maple, cherry, walnut, beech, mahogany, mango wood, sal wood, or ash.

Figure 2A:
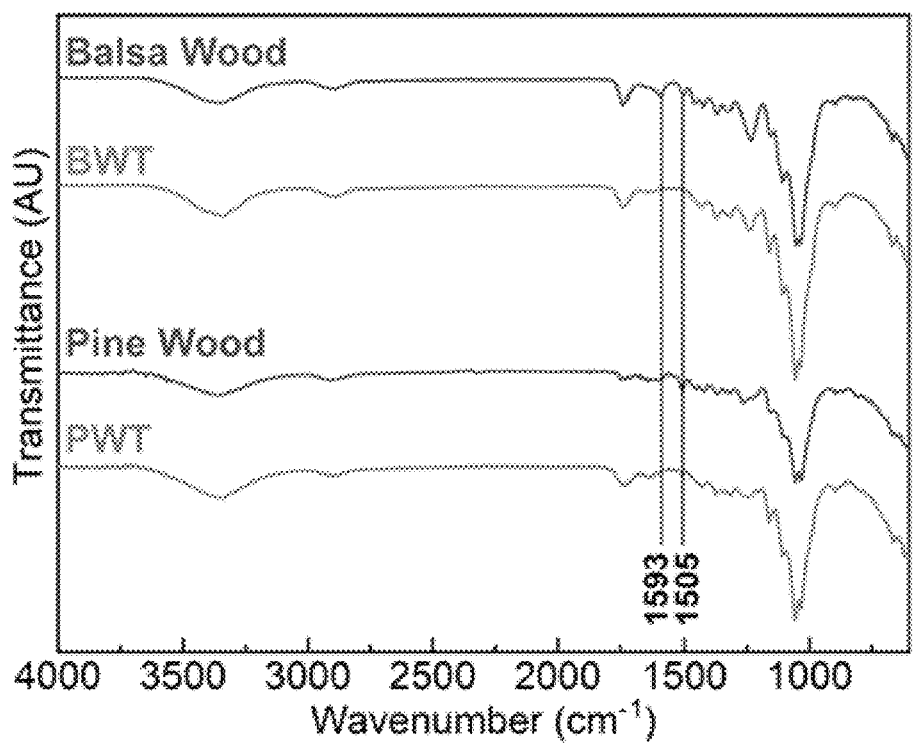
Figure 2B:
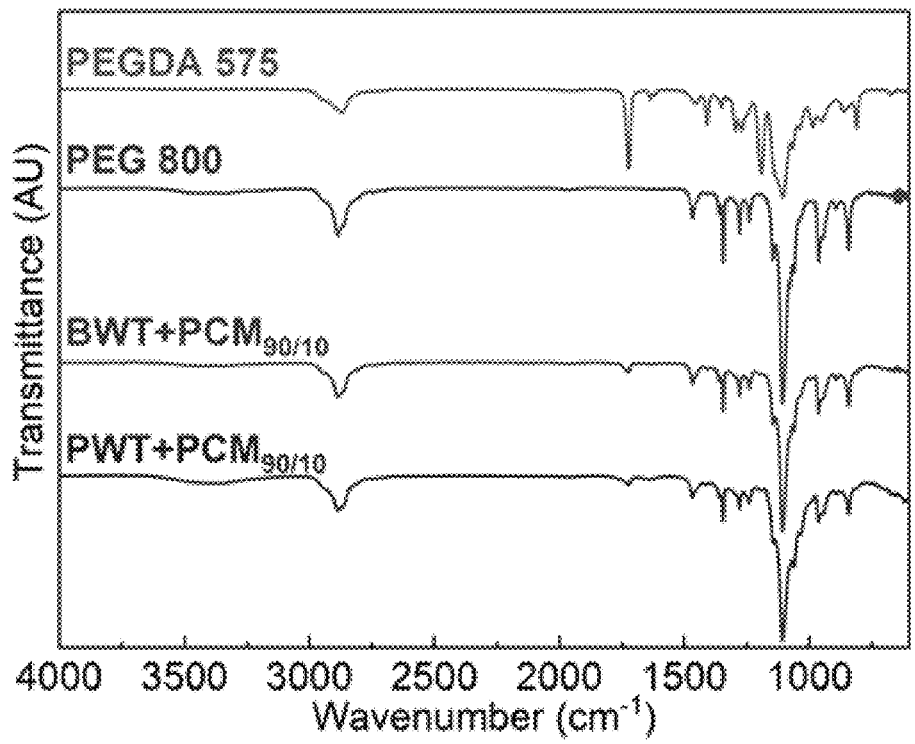

Fourier transform infrared (FTIR) spectra are illustrated in FIG. 2A for natural balsa wood, pine wood, pine wood template (PWT), and balsa wood template (BWT), and in FIG. 2B for polyethylene glycol (PEG), polyethylene glycol diacrylate (PEGDA), balsa wood template-supported change material in a PEG:PEGDA ratio of approximately 90:10 (BWT+PCM$_{90/10}$), and pine wood template-supported phase change material in a PEG:PEGDA ratio of approximately 90:10 (PWT+PCM$_{90/10}$), and thermogravimetric analysis (TGA) curves with first derivatives as an inset for c) natural balsa wood, pine wood, PWT, and BWT, and d) PEG, PEGDA, BWT+PCM$_{90/10}$, and PWT+PCM$_{90/10}$, according to some aspects of the present disclosure.

Figure 3:
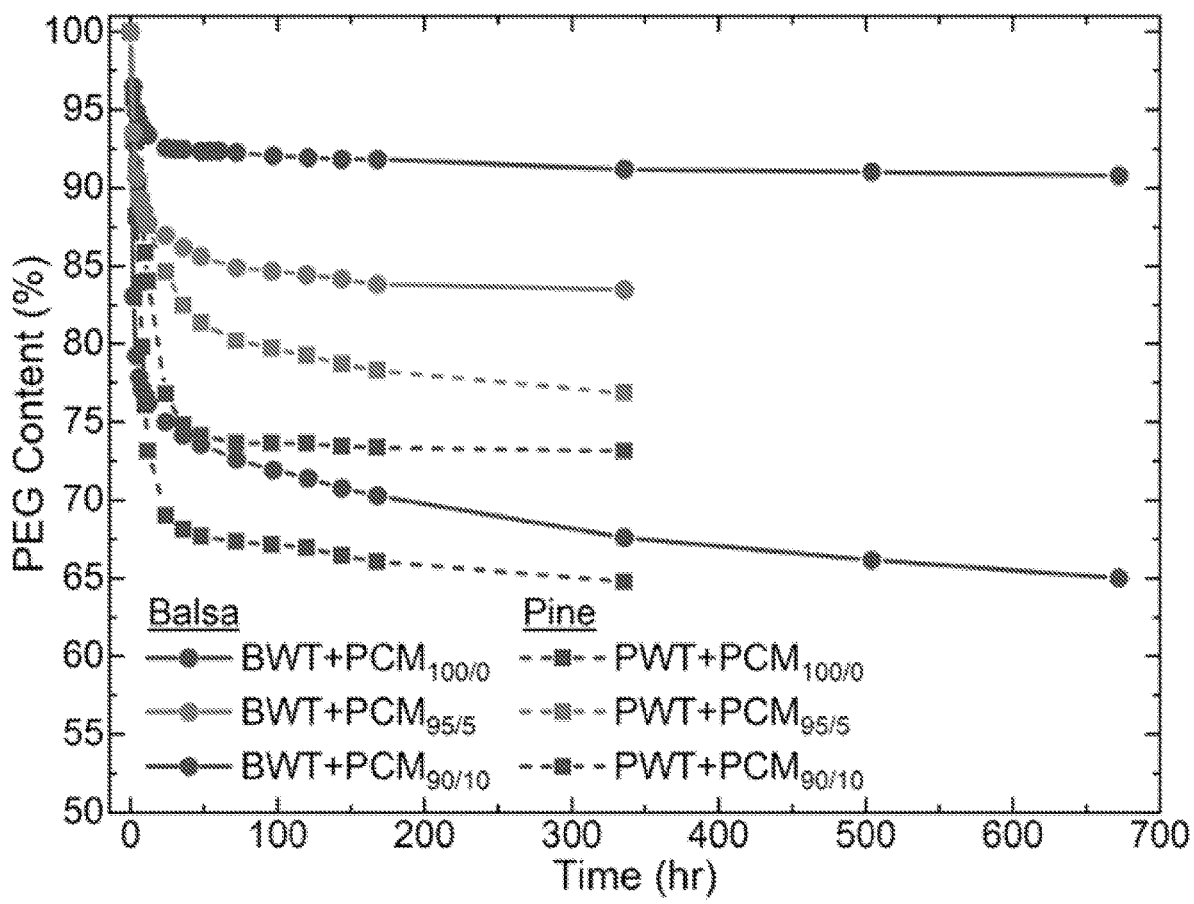

FIG. 3 illustrates isothermal leakage profile for BWT+PCMs and PWT+PCMs with ratios of PEG:PEGDA of approximately 100/0, approximately 95/5, and approximately 90/10, over the course of approximately one month, according to some aspects of the present disclosure.

Figure 4A:
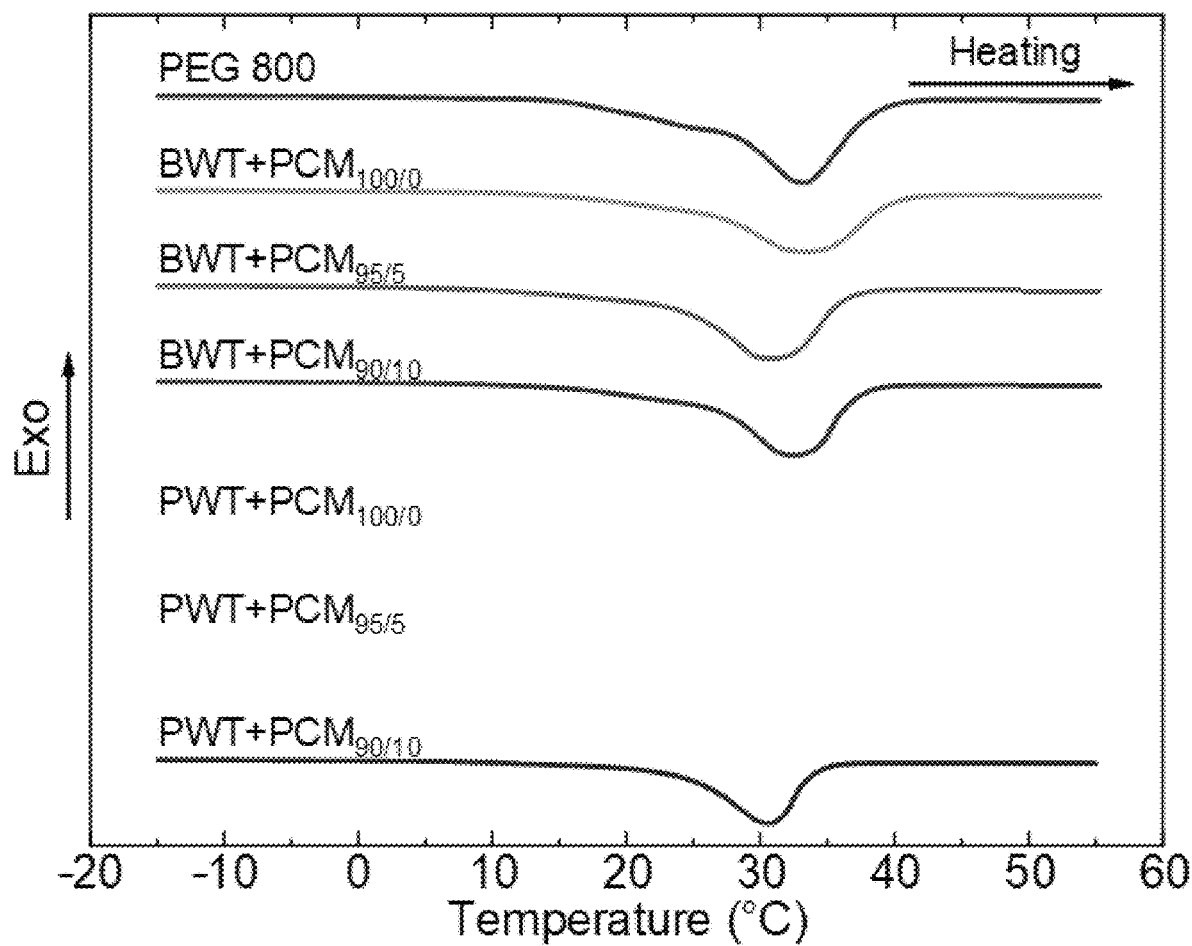
Figure 4B:
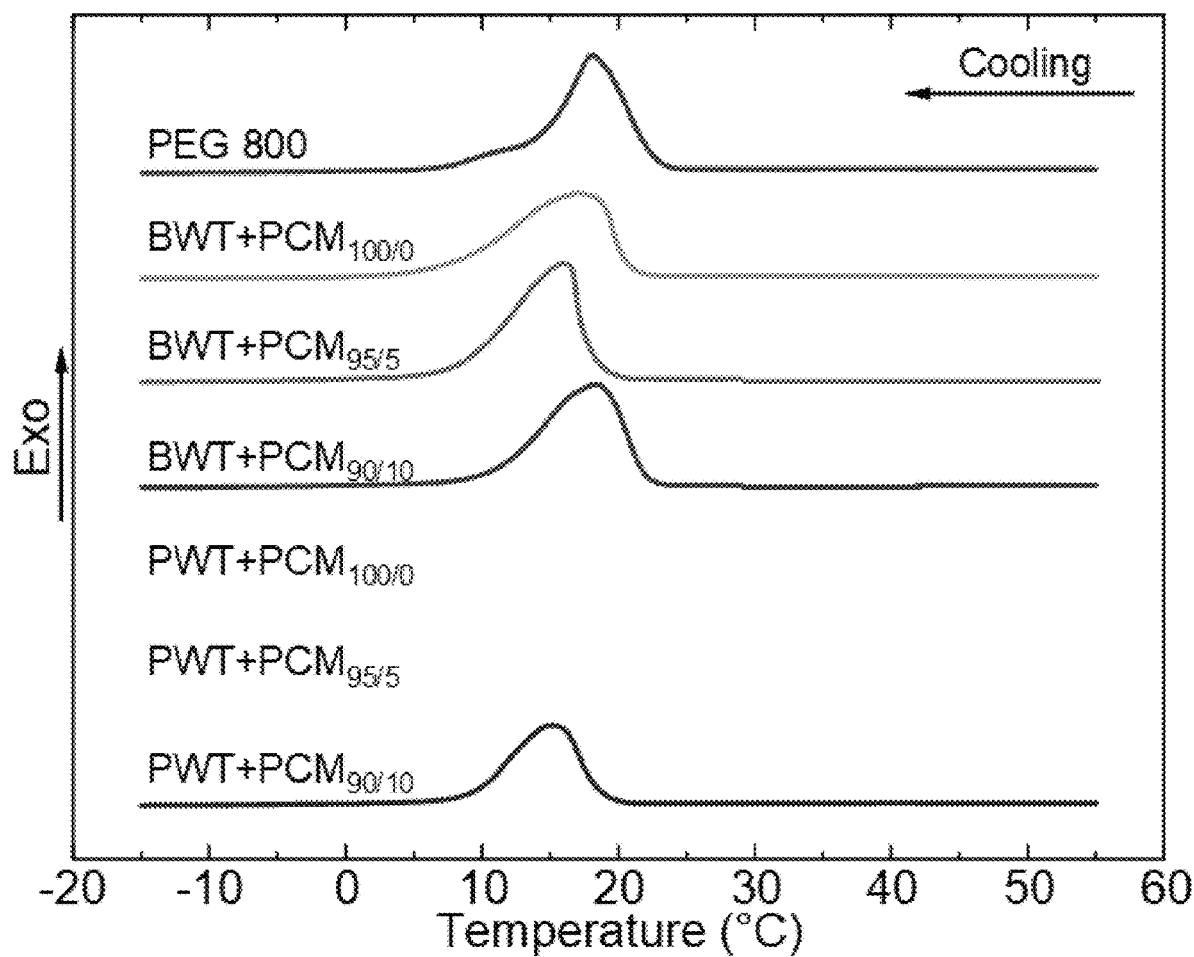

FIG. 4A illustrates a representative endothermic and FIG. 4B illustrates exothermic traces for pure PEG, BWT+PCMs, and PWT+PCMs, with ratios of PEG:PEGDA of approximately 100/0, approximately 95/5, and approximately 90/10, according to some aspects of the present disclosure.

Figure 5A:
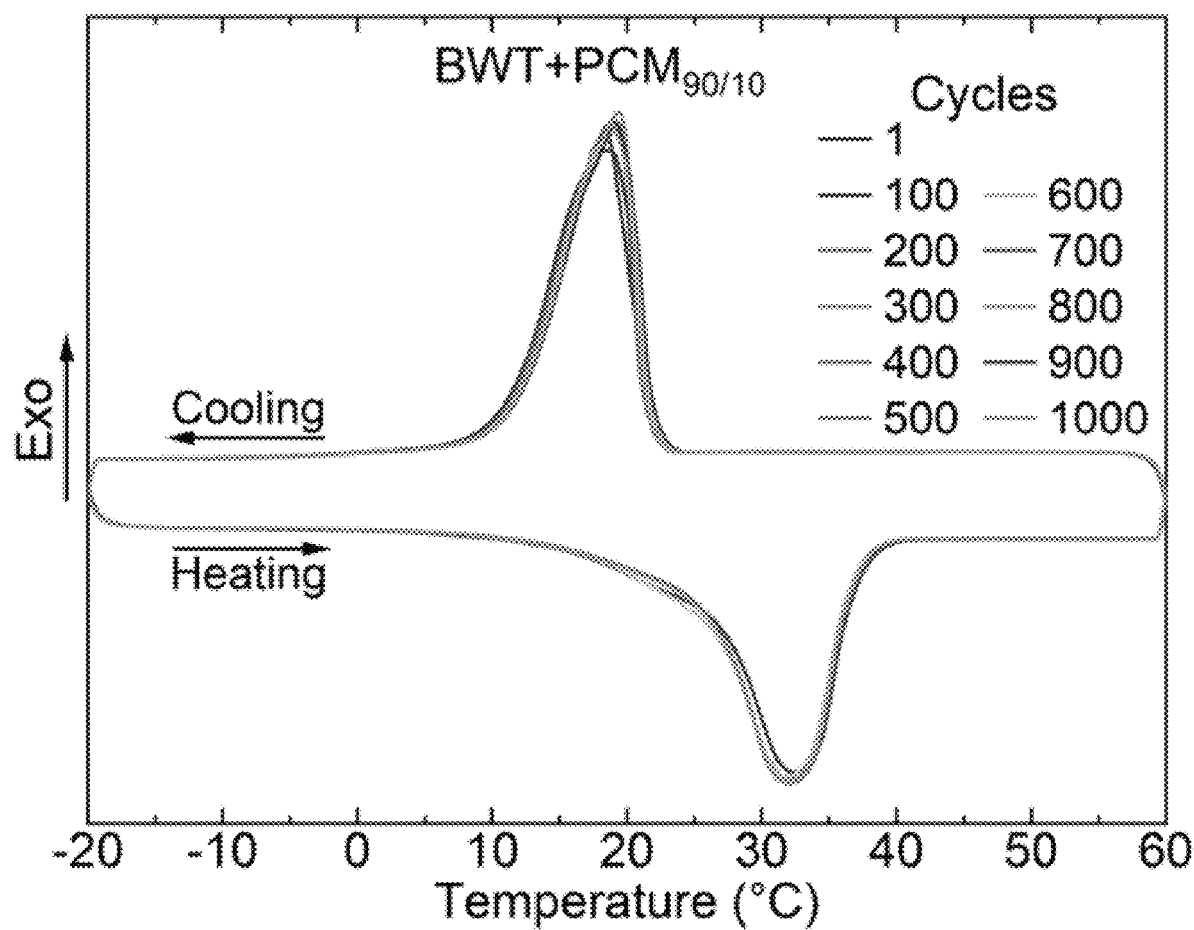
Figure 5B:
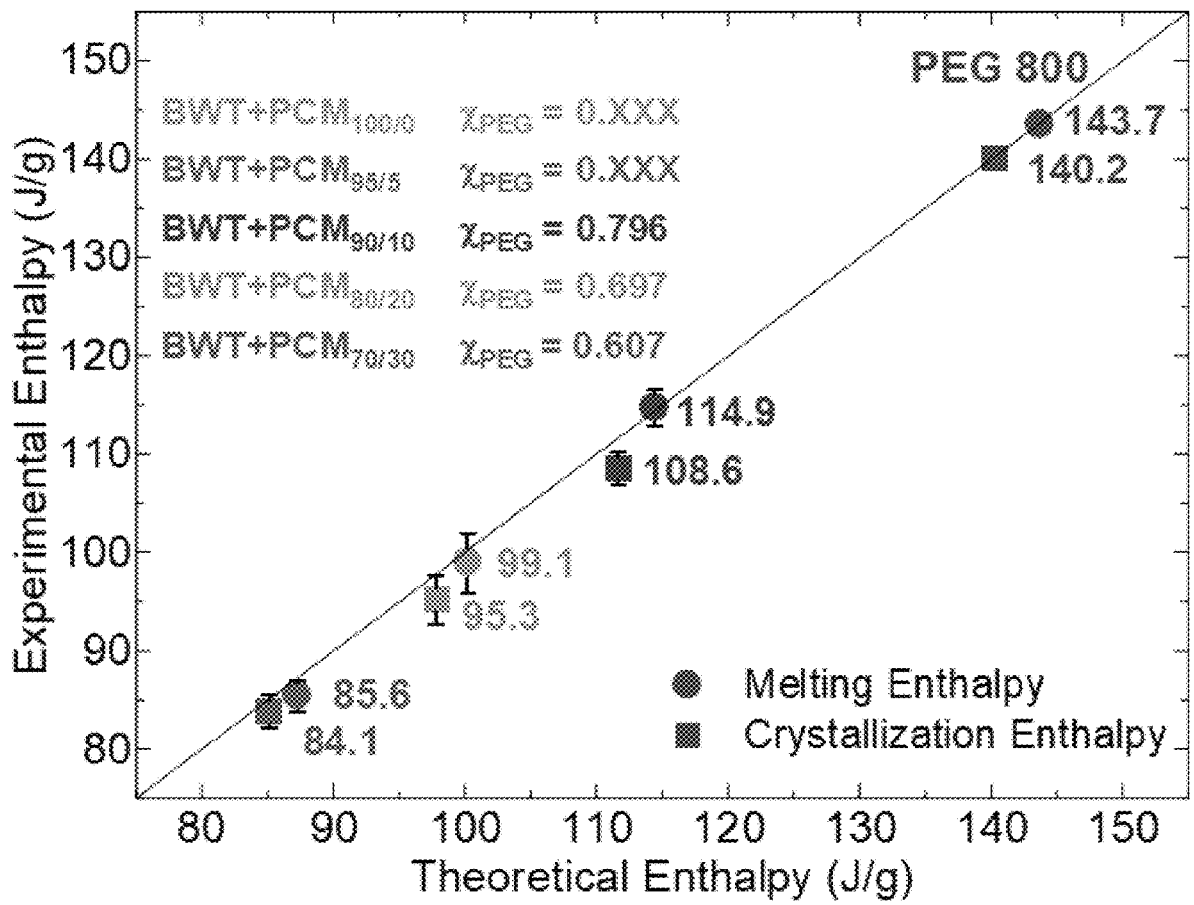

FIG. 5A illustrates overlayed differential scanning calorimetry (DSC) traces for each hundredth cycle of BWT+PCM$_{90/10}$ indicating durability over approximately 1000 cycles, and FIG. 5B illustrates comparison of theoretical enthalpy with experimental enthalpy for the BWT+PCMs with ratios of PEG:PEGDA of approximately 100/0, approximately 95/5, approximately 90/10, approximately 80/20, and approximately 70/30, showing that nearly all encapsulated PEG is participating in thermal energy storage, according to some aspects of the present disclosure.

Figure 6:
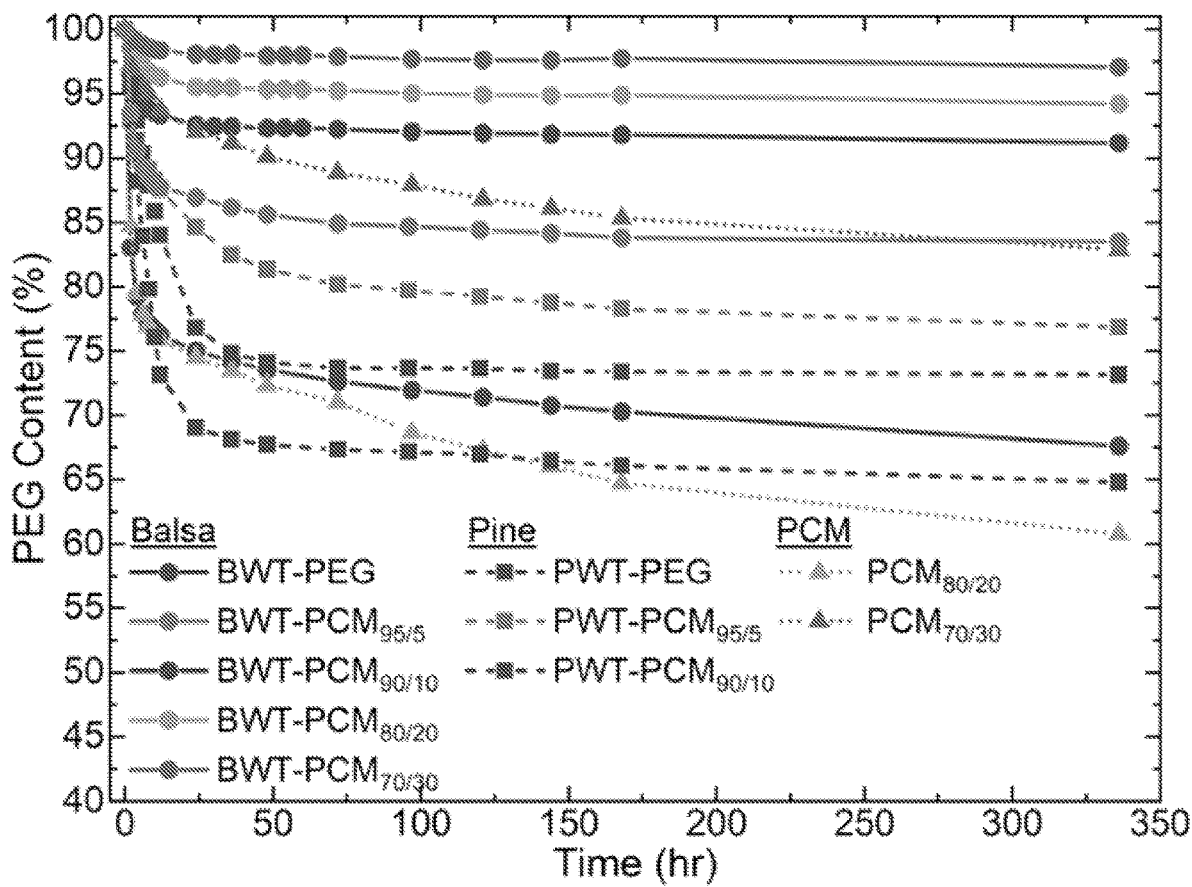

FIG. 6 illustrates an isothermal leakage profile for BWT+PCMs and PWT+PCMs with ratios of PEG:PEGDA of approximately 100/0, approximately 95/5, approximately 90/10, approximately 80/20, and approximately 70/30, over the course of approximately two weeks (i.e., approximately 14 days), according to some aspects of the present disclosure.

Figure 7:
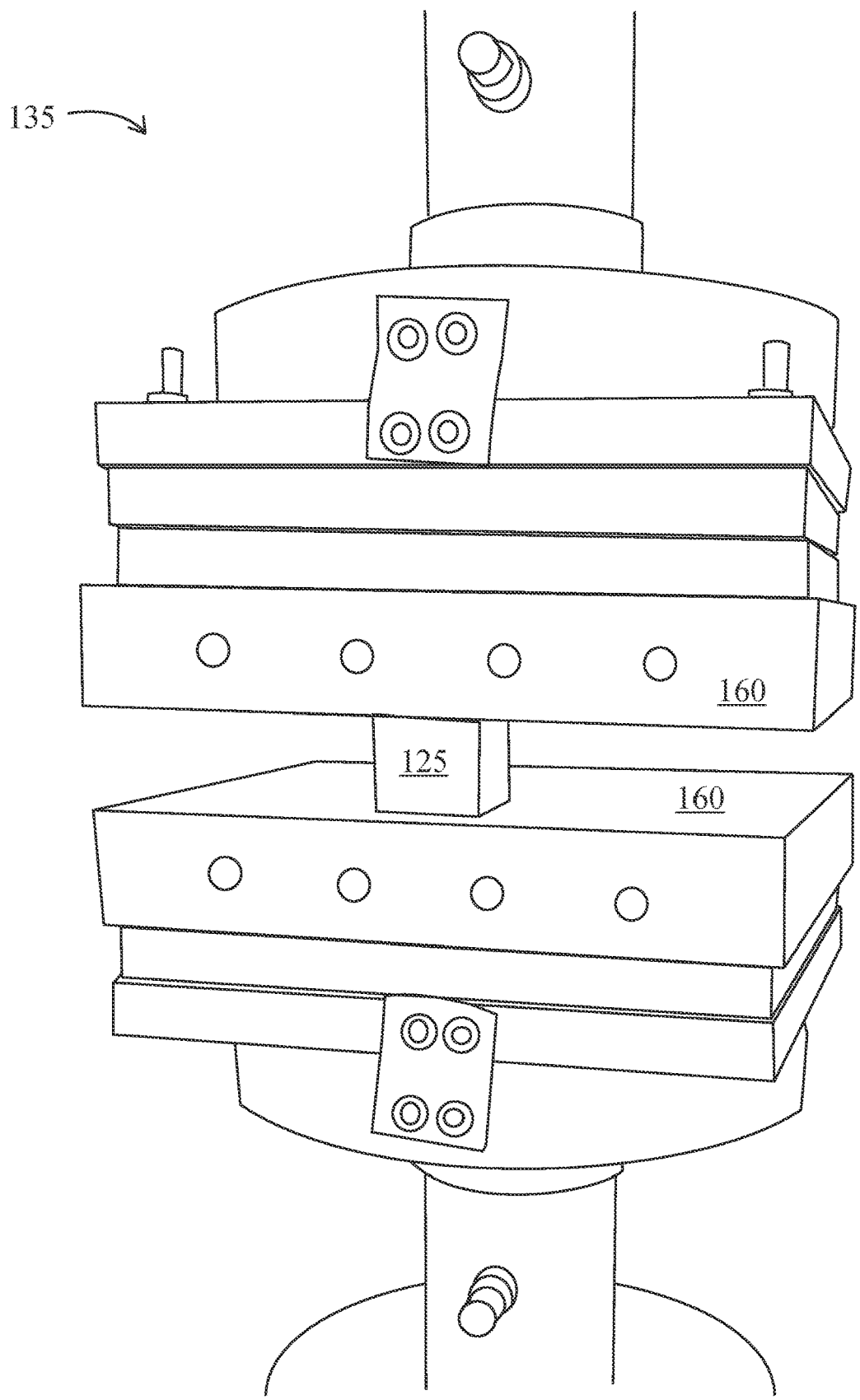

FIG. 7 illustrates a hot press which may be used for densifying at least a portion of a wood template, according to some aspects of the present disclosure.

Figure 8:
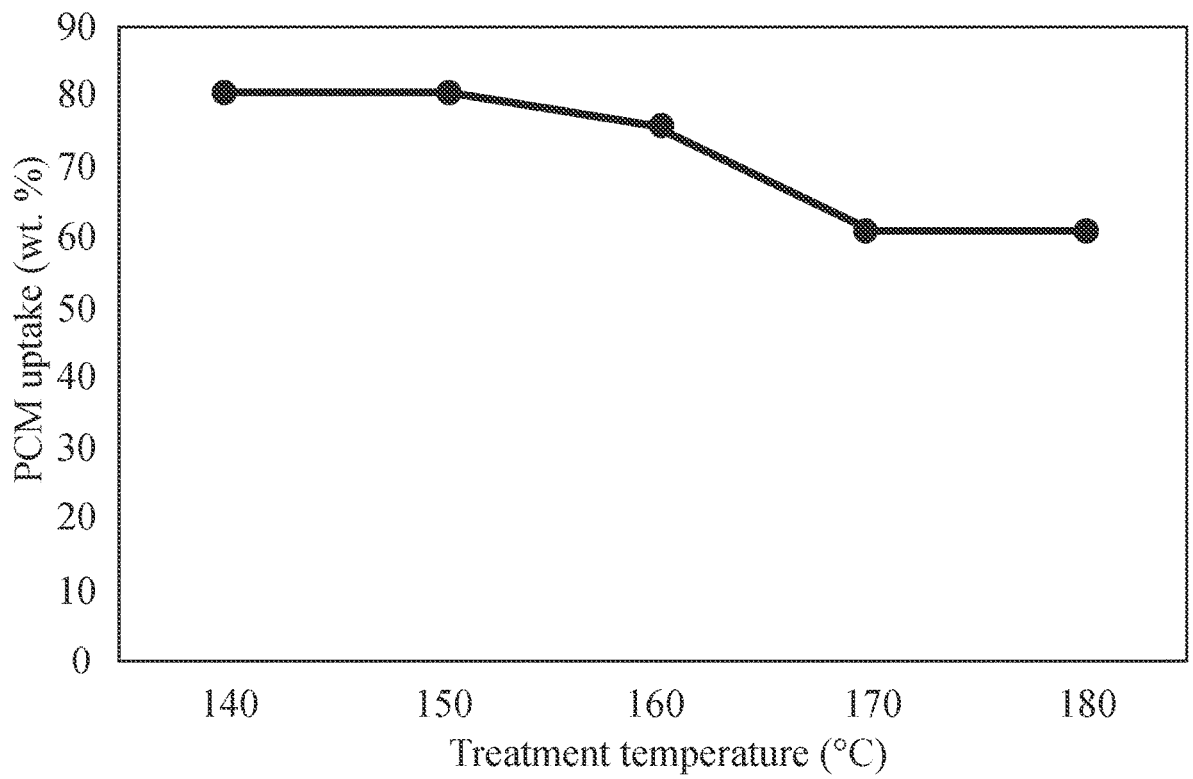

FIG. 8 illustrates PCM uptake of a BWT to form a wood template-supported PCM composite, according to some aspects of the present disclosure.

Figure 9:
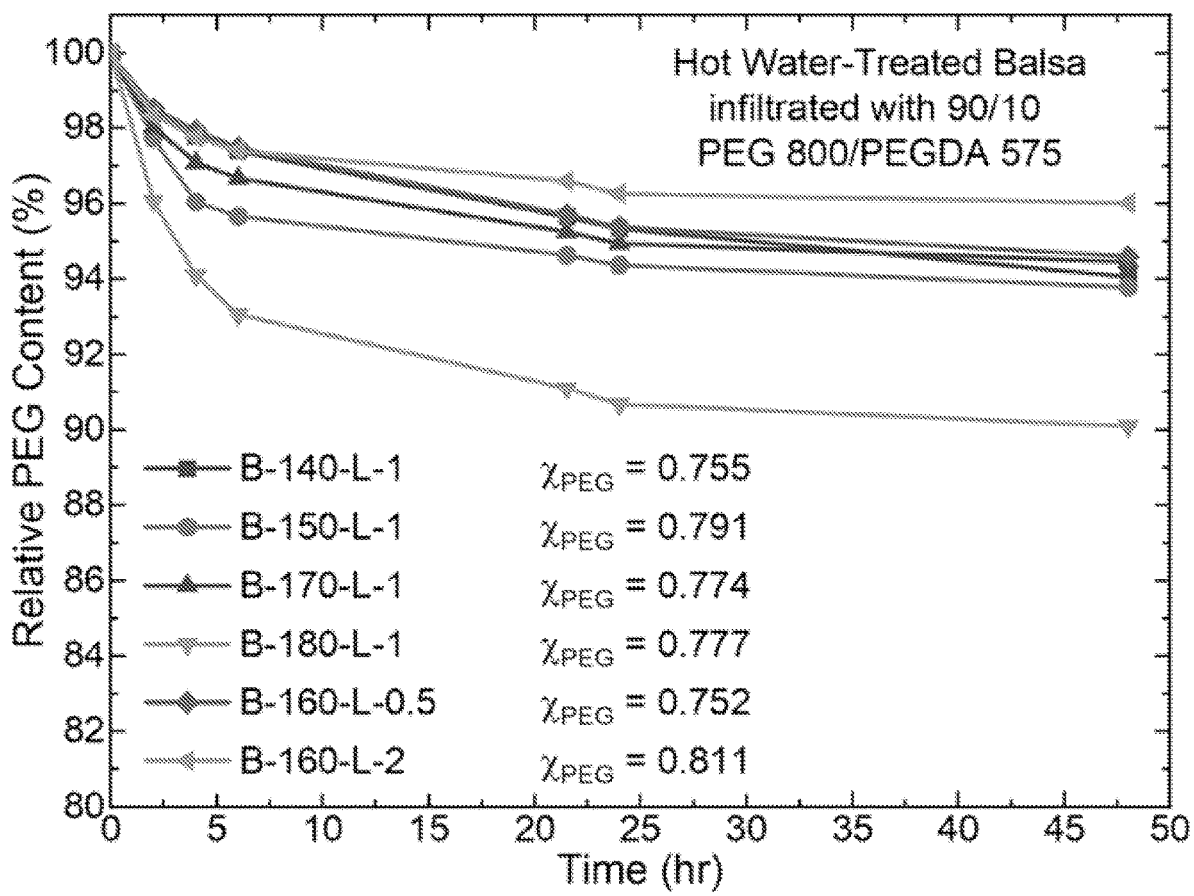

FIG. 9 illustrates PCM retention in a BWT-supported PCM composite, according to some aspects of the present disclosure.

REFERENCE NUMERALS

100 . . . method
105 . . . extracting
110 . . . densifying
115 . . . insetting
120 . . . wood
125 . . . wood template
130 . . . extracting solution
135 . . . press
140 . . . phase change material (PCM)
145 . . . stabilizing agent
150 . . . PCM/stabilizing agent solution
155 . . . wood template-supported PCM composite
160 . . . plate

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, +0.3%, ±0.2%, or ±0.1% of a specific numeric value or target.

As used herein, the term "wood template" (or WT) refers to a piece of wood that has had at least a portion of its xylan and/or lignin removed, leaving at least some cells removed of xylan and/or lignin, with the cell walls substantially intact. A wood template may have at least a portion more porosity than an untreated wood sample, making it capable of being saturated (i.e., infiltrated) with another material.

Among other things, the present disclosure relates to wood template-supported phase change material (PCM) composites having thermal energy storage (TES) applications. A wood template-supported PCM composite may include a wood template that has had at least a portion of its xylan and/or lignin removed and saturated with a phase change material (PCM). The PCM may be stabilized with a cross linkable network for improved infiltration into the wood template. The present disclosure also relates to forming the wood template-supported PCM composite by extracting xylan and/or lignin from the wood to create a wood template, densifying at least a portion of the wood template, and inserting a PCM into the wood template.

The present disclosure relates to wood template-supported PCM composites which may be fabricated for TES applications, such as in building envelopes. PCMs that undergo solid-to-liquid phase transitions often have high enthalpies of transition but may suffer from leakage issues. This may be addressed in the present enclosure by encapsulation of the PCM within a scaffold of a stabilizing agent. The support may keep the PCM substantially form-stable during thermal cycling (i.e., during phase changes). In some embodiments, the wood template-supported PCM composites described herein may include a PCM, stabilized with a cross linkable network, in a ratio in the range of about 100/0 to about 50/50 (PCM/stabilizing agent), infiltrated into a wood template.

Figure 1:
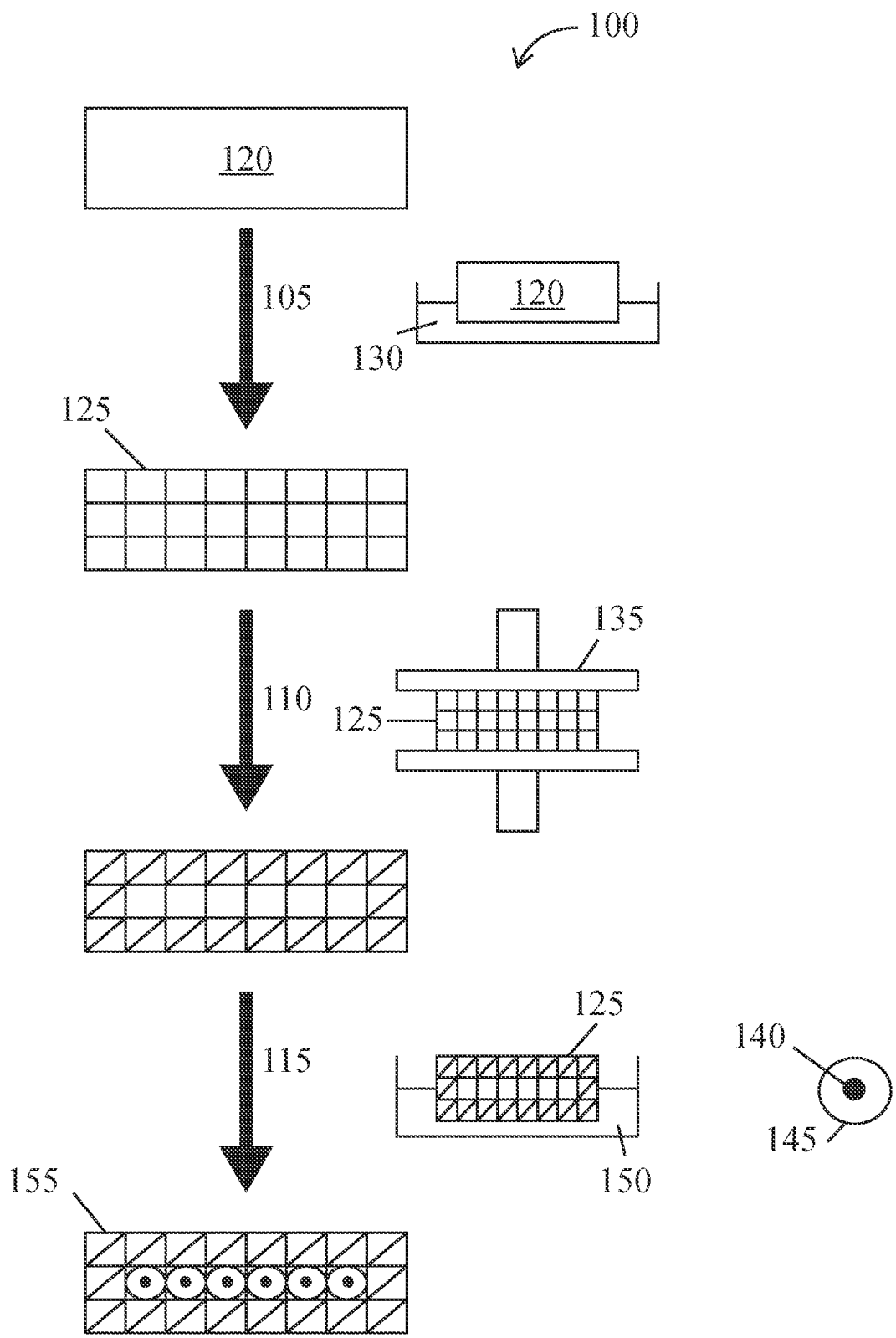
FIG. 1 illustrates a method of forming a wood template-supported phase change material (PCM) composite, according to some aspects of the present disclosure.

FIG. 1 illustrates a method 100 of forming a wood template-supported PCM composite 155, according to some aspects of the present disclosure. The method 100 includes extracting 105 at least a portion of the xylan and/or lignin from a wood sample 120 to form a wood template 125, densifying at least a portion of the wood template 125, and inserting a PCM into at least a portion of the wood template 125.

The method 100 includes first extracting 105 at least a portion of the xylan and/or lignin from a wood sample 120 to form a wood template 125. The extracting 105 may be done by soaking at least a portion of the wood sample 120 in a solution 130 containing water until the wood sample 120 is substantially saturated with water. The extracting 105 then includes removing the wood sample 120 from the solution 130 and then applying heat and/or pressure to the wood sample 120. For example, the wood sample 120 may be heated to a temperature in the range of about 100° C. to about 200° C. In some embodiments, the wood sample 120 may be heated to a temperature in the range of about 140° C. to about 190° C. The heat may be applied using pressurized steam. Finally, the extracting 105 may include rinsing the wood sample 120 with a solution containing water and/or methanol. The rinsing may be performed multiple times using a combination of water and methanol, just methanol, and/or just water in various cycles.

The next step in the method 100 is densifying 110 at least a portion of the wood template 125. In some embodiments, densifying 110 may include wetting at least a portion of the wood template 125 and compressing the wood template 125. The densifying 110 may be performed using a press 135 which may apply pressure on substantially parallel faces of the wood template 125. In some embodiments, the entire thickness of the wood template 125 may be densified 110 (i.e., the entire thickness of the wood template 125 may be wetted and compressed). In other embodiments, only a portion of the thickness of the wood template 125 may be densified 110 (i.e., only a portion of the thickness of the wood template 125 may be wetted and compressed). In some embodiments, wetting may be done by soaking (i.e., submerging the entire thickness or a portion of the thickness) the wood template 125 in water. In some embodiments, the wetting may be done by applying water (by spraying, dripping, using a brush, mop, or fabric) to the wood template 125. The pressure or compression may be applied using a press 135 which has two substantially parallel plates (which may be metal, ceramic, or another material). A first plate of the press 135 may be applied to a first side of the wood template 125 and a second plate of the press 135 may be applied to the second side of the wood template 125. The plates of the press 135 may move towards each other to apply the compression. In some embodiments, the plates may move at a rate of approximately 1 mm/min when applying pressure. In some embodiments, the plates of the press 135 may be heated prior to the compressing. For example, in some embodiments, the plates of the press 135 may be heated to anywhere in the range of about 30° C. to about 100° C. In some embodiments, the plates may be heated to approximately 85° C.

The next step in the method 100 is inserting 115 a phase change material (PCM) 140 into at least a portion of the wood template 125. The inserting 115 may include soaking the wood template 125 in a solution 150 which includes the PCM 140 and a stabilizing agent 145. The stabilizing agent 145 may be a cross linkable network to the PCM 140. In some embodiments, the stabilizing agent 145 may encapsulate the PCM 140. The plates of the press 135 may be maintained at a heated temperature during the compressing.

After the extracting 105, densifying 110, and inserting 115 are completed, the wood template-supported PCM composite 155 is formed and may be used for a variety of applications, including for thermal energy storage, using the PCM 140.

In some embodiments, the wood sample 120 may be pine, balsa, cedar, spruce, firwood, hemlock timber, teakwood, oak, maple, cherry, walnut, beech, mahogany, mango wood, sal wood, and/or ash. In some embodiments, the wood sample 120 may be a single kind of wood. In other embodiments, the wood sample, 120 may be a composite of multiple types of wood. For example, in some embodiments, the wood sample 120 may be a standard 2-in×4-in piece of lumber (i.e., a piece of raw timber that has been cut to have a cross section of approximately 2-in by approximately 4-in). However, in other embodiments, the wood sample 120 may be a sheet of flakeboard, particle board, or other composite of multiple smaller pieces of wood (with perhaps different types of wood). In that example, each individual "flake" of a sheet of flakeboard may be treated as a wood sample 120 herein and prepared to be a wood template-supported PCM composite 155, then these wood template-supported PCM composite 155 flakes may be combined into a larger flakeboard or particleboard. In other examples with a flakeboard, the flakeboard may be treated as a single wood sample 120

In some embodiments, the PCM 140 may be a material that can absorb and/or release heat when changing phase (i.e., going from liquid to solid or vice versa). Examples of PCMs 140 include water, salts, salt hydrates, hydroxides, paraffins, alcohols, metallics, fatty acids, esters, and/or polymers. In some embodiments, the PCM 140 may be polyethylene glycol (PEG). The PCM 140 may be an organic or inorganic phase change material.

In some embodiments, the stabilizing agent 145 may be a network that is cross-linkable with the PCM 140. That is, the stabilizing agent 145 may be capable of covalently bonding to the PCM 140 so as to provide a scaffold or support structure. In this way, the selection of the stabilizing agent 145 is dependent on the selection of the PCM 140. In some embodiments, the stabilizing agent 145 may encapsulate the PCM 140. In some embodiments, if the PCM 140 is PEG, the stabilizing agent 145 may be poly(ethylene glycol) diacrylate (PEGDA).

Stability and leakage profiles of BWT+PCMs and PWT+PCMs were tested via isothermal conditioning above the melting temperature for a month and durability of cycling was tested via subjecting the best performing wood template-supported PCM to approximately 1000 thermal cycles. The thermal properties, including temperatures and enthalpies of melting and crystallization were determined. After a month of isothermal conditioning at approximately 50° C., additions of PEGDA with a mass of 575 at about 10 wt % were sufficient to encapsulate greater than about 90% of the original infiltrated PEG, with masses stabilizing within 24 hours. WT infiltration with only PEG (BWT+PEG and PWT+PEG) was not sufficient in encapsulating PEG, resulting in ongoing leakage after a month of conditioning. The highest enthalpy composite, BWT+PCM$_{90/10}$, exhibited a melt enthalpy of 115 J/g at 25.4° C., matching the calculated theoretical enthalpy based on a total composite PEG content of 79.6 wt %. Matching the calculated theoretical enthalpy suggests that neither the wood template nor PEGDA interfered with TES behavior, indicating a robust PCM composite. After 1000 thermal cycles, no degradation in enthalpy response or drift in transition temperature was observed for WT+PCM$_{90/10}$, indicating superior durability and cyclability.

The present disclosure includes encapsulation of PEG in delignified balsa and southern pine wood templates using varying weight percent additions of cross linkable PEGDA for fabrication of form-stable TES composites. Balsa wood was chosen for its high internal cell volume for maximum PCM encapsulation and pine wood was selected for comparison with a species that is more industrially relevant. PEG with a molecular weight of 800 Da was selected as a PCI 140 for its high latent heat and transition temperatures within the range of indoor thermal comfort (approximately 20-25° C.). Since the target application is within the building envelope, long-term durability testing was performed to ensure an adequate consideration of service life. Stability testing was conducted under isothermal conditions at approximately 50° C. over the course of a month to characterize initial leakage and ensure molten PEG was retained within the wood template at long time scales. Thermal performance of the best performing wood template-supported PCM was tested over 1000 thermal cycles to ensure that no degradation in TES properties was observed.

Balsa wood with dimensions of approximately 50 mm by 50 mm by 3.2 mm and an average density of about 0.119 g/cm$^3$ and pine wood with dimensions of approximately 50 mm by 50 mm by 3.7 mm and an average density of about 0.394 g/cm$^3$ was utilized for most experiments described herein, although other wood products could be used. PEG with an average molecular weight of about 800 Da (PEG 800), PEGDA with an average molecular weight of about 575 Da (PEGDA 575), and a 30% hydrogen peroxide solution were also used.

Balsa and pine wood sheets were oven dried to obtain a dry mass before immersion in an approximately 1:1 v/v solution of glacial acetic acid to hydrogen peroxide (30%) at a ratio of about 80 mL solution per about 1 g of wood. Delignification proceeded at approximately 40° C. for about 24 hours with a second round of delignification applied to the pine wood under the same conditions. The wood templates, termed BWTs for balsa and PWTs for pine, were washed in substantially deionized water until the washing solution exhibited pH of greater than about 6. All WTs were dehydrated via sequential solvent exchanges from ethanol to ethanol/acetone (about 1:1 v/v) to acetone. Each solvent exchange was repeated twice (about 1 hour each), and WTs were then oven dried at approximately 80° C. under house vacuum (about 250 mmHg pressure) to determine mass loss. After mass determination, WTs were saturated in ethanol and stored until composite preparation.

PCM solutions of PEG 800 and PEGDA 575 were prepared through weight addition of 0%, 5%, or 10% PEGDA 575 to PEG 800 at 45° C. to keep PEG in the molten phase. PCMs 140 are denoted by the PEG/PEGDA weight ratios, PCM$_{95/5}$, and PCM$_{90/10}$. Ethanol-saturated BWTs and PWTs were submerged in the PCM 140 solutions and degassed at about 45° C. for 16 hours to promote PCM 140 infiltration into the wood templates 125 and remove ethanol then subsequently heated to about 65° C. for about 2 hours to ensure polymerization of PEGDA.

Lignin content was determined by the NREL laboratory analytical procedure. Fourier Transform Infrared Spectroscopy (FTIR) was used to observe peaks associated with lignin removal and characterize PCM materials. Samples were assessed using a Nicolet iS20 spectrometer with an Attenuated Total Reflection (ATR) accessory. Since using an ATR accessory only captures signals at the surface level, wood-based samples were bisected to obtain internal surface measurements and ensure homogeneity of the samples. Spectra were collected in the range of about 4000 to about 600 cm$^{-1}$ at resolution of approximately 0.48 cm$^{-1}$. Thermogravimetric analysis (TGA) was carried out on a TA TGA5500 in a substantially N$_2$ atmosphere using a ramp rate of about 5° C./min in the range of about 30° C. to about 700° C. to determine high temperature thermal stability and decomposition. MicroCT was acquired with a Zeiss Xradia 520 Versa using a 20× objective, voltages in the range of about 40 V to about 60 V and a voxel size in the range of about 0.71 μm to about 0.84 μm to image wood and composite samples.

Isothermal PCM stability and leakage testing was conducted at about 50° C. by placing samples on a Kimwipe affixed to a glass pane. Sample mass was taken approximately every 2 hours for about the first 12 hours, followed by about every 12 hours for about the first 2 days, then about once a day for the first 7 days, and finally about once a week for about a month. Kimwipes were exchanged at each time point to ensure superficial PEG was removed.

Differential scanning calorimetry (DSC) was carried out using a Q2000 under a N$_2$ atmosphere using a ramp rate of about 5° C./min, over a temperature range of −20° C. to 60° C. to determine thermal properties. Durability testing over about 1000 cycles was conducted using a ramp rate of approximately 20° C./min over the temperature range between about −20° C. to about 60° C. with each hundredth cycle tested at approximately 5° C./min.

Theoretical enthalpy responses of TES materials assess whether all PEG contained within the wood template-supported PCM composite 155 is participating in thermal events. The hierarchical nature of the wood template allows for infiltration of materials within cell lumina as well as cell walls. Theoretical enthalpy for a wood template-supported PCM 155 composite is calculated using the equation:

$$\Delta H_{Theo} = \chi_{PEG} \times \Delta H_{PEG} \quad \text{Eq. 1}$$

where $\Delta H_{PEG}$ and $\chi_{PEG}$ and are the enthalpy and weight fraction of PEG.

Thermal energy storage efficiency ($\eta_{TES}$) characterizes the energy storage capacity of a composite relative to the performance of pure PEG and is calculated with the equation:

$$\eta_{TES}(\%) = \frac{\Delta H_{WT+PCM}}{\Delta H_{PEG}} \times 100 \quad \text{Eq. 2}$$

where $\Delta H_{WT+PCM}$ is the enthalpy responses for the wood template-supported PCM composites 155. In an ideal case, $\eta_{TES}$ is reflective of the PEG content of the composite.

Degree of supercooling ($\Delta T_s$) measures temperature responsiveness of the PCM 140 to crystallize at the same temperature of melting. Organic PCMs 140 generally do not exhibit severe supercooling when compared with inorganic PCMs 140. Degree of supercooling is commonly measured as the difference between melting and crystallization temperatures and is represented by:

$$\Delta T_s = T_m - T_c \quad \text{Eq. 3}$$

where $T_m$ and $T_c$ are melting and crystallization temperatures, respectively. $\Delta T_s$ will depend on the applied heating/cooling rate, so all transition temperatures discussed here are determined at a rate of about 5° C./min.

One round of delignification for balsa wood reduced the lignin content and two rounds of delignification for pine reduced the lignin content. There was a residual coloration in the BWTs and PWTs, indicating that some lignin byproducts were likely still present.

Fourier transform infrared (FTIR) spectra are illustrated in FIG. 2A natural balsa wood (labeled Balsa Wood), natural pine wood (labeled Pine Wood), pine wood template (labeled PWT), and balsa wood template (labeled BMT), and in FIG. 2B polyethylene glycol (labeled PEG 800), polyethylene glycol diacrylate (labeled PEGDA 575), balsa wood template-supported PCM composite 155 in a PEG:PEGDA ratio of approximately 90:10 (labeled BWT+PCM$_{90/10}$), and pine wood template-supported PCM composite 155 in a PEG:PEGDA ratio of approximately 90:10

Figure 2C:
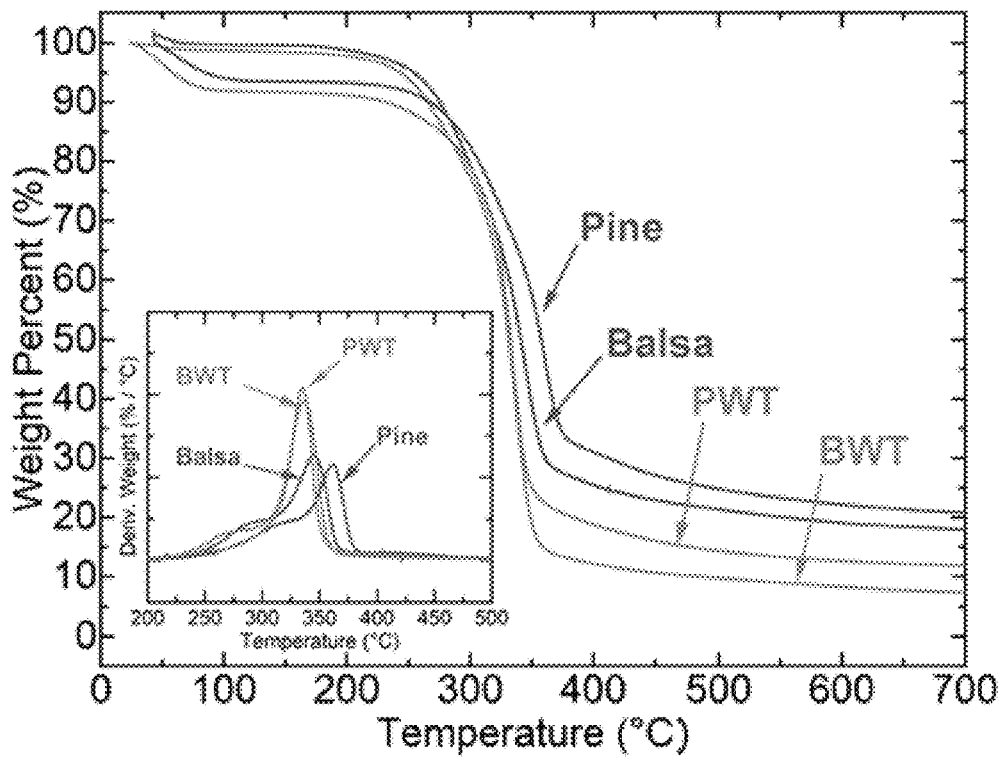
Figure 2D:
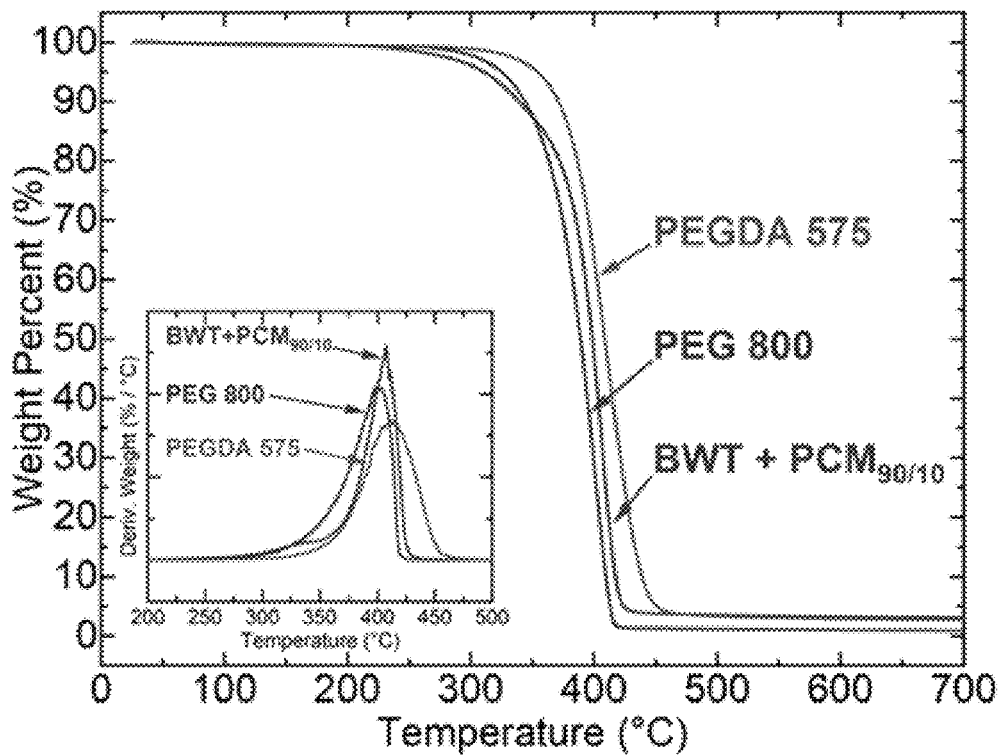

(labeled PWT+PCM$_{90/10}$), and thermogravimetric analysis (TGA) curves with first derivatives as an inset for in FIG. 2C natural balsa wood, natural pine wood (labeled Pine Wood), PWT, and BWT, and in FIG. 2D PEG, PEGDA, BWT+PCM$_{90/10}$, and PWT+PCM$_{90/10}$, according to some aspects of the present disclosure. Disclosed herein are methods and systems for construction of common building materials such as drywall, oriented strand board (OSB) sheathing, plywood, or similar materials that have a reduced weight and increased R-value while maintaining durable mechanical strength at normal operating conditions. Delignification was confirmed via FTIR, shown in panel a) of FIG. 2, demonstrated by the disappearance of peaks for aromatic ring stretching at approximately 1593 cm$^{-1}$ and approximately 1505 cm$^{-1}$, indicating that aromatic rings of lignin were decomposed. Sectioning of the BWT+PCMs and PWT+PCMs to test internal interfaces revealed a near identical spectra for PEG 800, shown in panel b) of FIG. 2. The similarity in spectra suggests that the PCM 140 of PEG 800 was well incorporated into cell walls of the wood templates 125, both BWT and PWT. An additional peak at approximately 1720 cm$^{-1}$ is present, representing a carbonyl stretch which could be attributed to either PWT, BWT, or PEGDA 575.

Thermal decomposition profiles for each material are presented in FIG. 2C and FIG. 2D, where the first derivative for each profile is shown as an inset plot. Balsa, BWT, pine, and PWT each exhibited one main decomposition event with onsets at approximately 299° C., approximately 305° C., and approximately 313° C., respectively, PEG 800, BWT+PCM$_{90/10}$, and PEGDA 575 exhibited similar decomposition profiles with onsets at approximately 366° C., approximately 377° C., and approximately 380° C., respectively. Infiltration of PEG and PEGDA increased thermal stability in the wood template 125 and thermal decomposition is effectively dictated by PEG, suggesting favorable interactions between the two materials.

FIG. 3 illustrates isothermal leakage profile for wood template-supported PCM composites 115, specifically BWT+PCMs and PWT+PCMs, with PCMs 140 and stabilizing agents 155, in ratios of PEG:PEGDA of approximately 100/0, approximately 95/5, and approximately 90/10, over the course of approximately one month, according to some aspects of the present disclosure. To understand a viability of wood templates, specifically BWT and PWT, as encapsulation scaffolds for PCMs, aggressive leakage and stability testing is critical. To date, there is limited leakage testing in the existing wood template-supported PCM literature. Isothermal conditioning was conducted at approximately 50° C., approximately 25° C. above the melting temperature of PEG, for a month to determine long-term stability and leakage profiles for BWT and PWT. While operational expectations of PCMs 140 in building envelopes would likely not be in a sustained melt state on the time scale of a month, it is important to strenuously test these materials to best understand long-term stability. A plot of total PEG content versus conditioning time for each composite can be seen in FIG. 3. Without PEGDA as a stabilizing agent 145 in the BWT+PCM$_{100/0}$ and PWT+PCM$_{100/0}$ samples, there was a substantial loss of PEG that took longer to equilibrate in mass compared to composites that included some quantity of PEGDA. This more rapid mass stabilization when PEGDA is included suggests that there is a synergistic effect between the wood template and PEGDA that contributes to high PEG 800 retention. After a month of conditioning, the BWT+PCMs appeared whitened at the top and bottom edges where superficial PEG has leaked from the exposed cell lumina cross sections. In the PWT+PCMs, the loss of PCM at the surface of the samples exposed the fiber structure, giving the appearance closer the natural wood. Weight percentages of PEG 800 relative to total composite weights are shown in FIG. 2C and FIG. 2D. Because pine is a denser wood species compared with balsa, the weight contribution of PWTs is approximately 25 wt %, where BWTs is approximately 10 wt %, meaning balsa has a relatively greater storage capacity per unit mass than pine.

FIG. 4A illustrates a representative endothermic and FIG. 4B illustrates exothermic traces for pure PEG, BWT+PCMs, and PWT+PCMs, with ratios of PEG:PEGDA of approximately 100/0, approximately 95/5, and approximately 90/10, according to some aspects of the present disclosure. Thermal responses of all wood template-supported PCMs over melting and crystallization cycles are presented in FIG. 4A and FIG. 4B. PEG 800 exhibited melt and crystallization enthalpies of 144 J/g and 140 J/g at temperatures of approximately 25.5° C. and approximately 22.8° C., respectively. PEGDA 575 and the wood template did not exhibit thermal transitions in the temperature range of approximately −20° C. to approximately 60° C., indicating that the TES response in wood template-supported PCMs can solely be attributed to PEG. Representative endothermic and exothermic traces for all wood template-supported PCMs and PCMs are shown in both panel a) and panel b) of FIG. 4 demonstrating that the influence of the wood template 125 or stabilizing agent 155 (i.e., PEGDA) on the transition temperature of a PCM 140 of PEG is substantially minimal.

TABLE 1

Thermal properties of wood template-supported PCMs composites 155 with regard to melting and crystallization processes.

| | PEG Content wt % | $T_m$ ° C. | $\Delta H_m$ J/g | Theo $\Delta H_m$ J/g | $\eta_{endo}$ % | $T_c$ ° C. | $\Delta H_c$ J/g | Theo $\Delta H_c$ J/g | $\eta_{exo}$ % | $\Delta T_s$ ° C. |
|---|---|---|---|---|---|---|---|---|---|---|
| PEG 800 | 100 | 25.5 ± 0.4 | 144 ± 1.0 | — | — | 22.8 ± 0.2 | 140 ± 0.9 | — | — | 2.8 |
| BWT + PCM$_{100/0}$ | 88.8 ± 0.2 | 24.5 ± 0.4 | 115 ± 2.7 | 128 | 80.3 | 20.4 ± 0.2 | 110 ± 2.6 | 124 | 78.3 | 4.1 |
| BWT + PCM$_{90/10}$ | 79.6 ± 1.4 | 25.4 ± 0.6 | 115 ± 1.8 | 114 | 79.9 | 21.5 ± 0.7 | 109 ± 1.6 | 112 | 77.5 | 3.9 |

FIG. 5A illustrates overlayed differential scanning calorimetry (DSC) traces for each hundredth cycle of BWT+PCM$_{90/10}$ indicating durability over approximately 1000 cycles, and FIG. 5B illustrates comparison of theoretical enthalpy with experimental enthalpy for the BWT+PCMs with ratios of PEG:PEGDA of approximately 100/0, approximately 95/5, approximately 90/10, approximately 80/20, and approximately 70/30, showing that nearly all encapsulated PEG is participating in TES, according to some aspects of the present disclosure. Nearly all theoretical enthalpies ($\Delta H_{Theo}$) for wood template-supported PCMs in this work were within the first standard deviation of experimental measurements, indicating adequate preservation of melting and crystallization behavior. For BWT+PCM$_{90/10}$, the PCM efficiencies, $\eta_{endo}$ and $\eta_{exo}$, are approximately 79.9% and approximately 77.5%, respectively, and the PCM was substantially contained within the wood template. The degree of supercooling for pure PEG 800 was about 2.8° C. and when incorporated into the wood template, in this case BWT+PCM$_{90/10}$, and the $\Delta T_s$ only increases to about 3.9° C.

Integration of wood template-supported PCM composites into building envelopes means that long term durability is essential. The composite with the combined highest TES capacity and fasted equilibration, BWT+PCM$_{90/10}$, was subjected to approximately 1000 thermal cycles. Durability testing over the approximately 1000 cycles was conducted using a ramp rate of approximately 20° C./min over the temperature range of approximately −20° C. to approximately 60° C. at about every 100$^{th}$ cycle tested at approximately 5° C./min.

DSC traces are shown in FIG. 5A. Over the course of the 1000 cycles, there was no significant change in transition temperature or enthalpy. Melting and crystallization temperatures averaged approximately 25.1° C. and approximately 21.5° C., respectively, and melting and crystallization enthalpies averaged approximately 115.1 J/g and approximately 109.5 J/g, respectively. The consistency of the thermal response over about 1000 cycles indicates substantially minimal degradation in the wood template-supported PCM composite, resulting in substantially stable TES performance. In the context of daily thermal cycles, these results indicate substantially durability of wood template-supported PCMs on the order potentially of several years.

TABLE 2

Thermal properties of BWT + PCM90/10 over about 1000 thermal cycles.

| Cycle | $T_m$ (° C.) | $\Delta H_m$ (J/g) | $T_c$ (° C.) | $\Delta H_c$ (J/g) |
|---|---|---|---|---|
| 1 | 25.4 | 113.2 | 21.9 | 107.4 |
| 100 | 25.1 | 115.4 | 21.3 | 108.7 |
| 200 | 25.1 | 115.3 | 21.1 | 109.1 |
| 300 | 25.1 | 115.5 | 21.2 | 109.6 |
| 400 | 25.1 | 115.2 | 21.4 | 109.9 |
| 500 | 25.1 | 115.4 | 71 2 | 109.9 |
| 600 | 24.9 | 115.4 | 21.6 | 109.3 |
| 700 | 25.1 | 115.1 | 21.8 | 110.1 |
| 800 | 25.1 | 115.9 | 21.7 | 110.3 |
| 900 | 25.1 | 115.0 | 22.0 | 110.1 |
| 1000 | 25.1 | 115.1 | 21.8 | 110.1 |

FIG. 6 illustrates an isothermal leakage profile for BWT+PCMs and PWT+PCMs with ratios of PEG:PEGDA of approximately 95/5, approximately 90/10, approximately 80/20, and approximately 70/30, over the course of approximately two weeks (i.e., approximately 14 days), according to some aspects of the present disclosure. °The combination of PCM and stabilizing agent (in the form of PEG and PEGDA) appear to result in less leakage than only PCM or only PCM (i.e., PEG) in a wood template. This shows the leakage to be contained, indicating the wood template-supported PCM composite as described herein may be relatively stable for extended periods of time.

As described herein, the thermal properties and durability of wood template-supported PCM composites 155 comprised of PEG 800 were characterized and infiltrated into a delignified balsa and pine wood template 125 stabilized with varying weight additions of PEGDA 575 for TES applications in building envelopes. Additions of 10 wt % PEGDA 575 were sufficient to encapsulate greater than approximately 90% of PEG 800 in BWT+PCMs after a month of isothermal conditioning at approximately 50° C. The highest enthalpy composite, BWT+PCM$_{90/10}$, exhibited a melt enthalpy of approximately 115 J/g at approximately 25.4° C., matching the calculated theoretical enthalpy based on a total PEG content of approximately 79.6 wt %. Matching the calculated theoretical enthalpy suggests that neither the wood template nor PEGDA interfered substantially with TES behavior. After about 1000 thermal cycles, no degradation in enthalpy response or drift in transition temperature was observed for WT+PCM$_{90/10}$, demonstrating performance durability on the order of several years of daily thermal cycling. The present disclosure indicates that encapsulation of PEG 800 in a delignified BWT or PWT with PEGDA 575 as a stabilizing crosslinked polymer network (i.e., using a stabilizing agent), yield a relatively form-stable TES composite. Wood templates are an efficient encapsulation scaffold that are readily available, easily processed in a top-down approach, capable of high storage volumes, and do not interfere with thermal transitions of PEG-based PCMs. The beneficial TES performance coupled with the widespread acceptance of wood-polymer composites in the construction industry make wood template-supported PCM composites ideal TES material candidates for building envelopes.

FIG. 7 illustrates a hot press 135 which may be used for densifying at least a portion of a wood template 125, according to some aspects of the present disclosure. The press 135 may include at least two plates 160, which may be oriented substantially parallel to each other. The plates 160 may be made of a conductive material, such as a metal, which can transfer heat to the wood template 125 while applying a pressure to the wood template.

FIG. 8 illustrates PCM uptake of a BWT, according to some aspects of the present disclosure. PCM uptake is the absorption of PCM into the wood template (i.e., into the cells or pores created by the removal of xylan and/or lignin from a wood sample). The xylan and/or lignin was removed from a approximately 3.5 mm thick, approximately 1 inch wide, and approximately 1 inch long balsa wood sample by pre-soaking the balsa wood sample in water until the balsa wood sample was substantially saturated with water. Then the saturated balsa wood sample was subjected a temperature of approximately 140° F. to approximately 190° F. under pressurized steam. The balsa wood sample was then held at a temperature above approximately 140° F. for approximately 1-2 hours, then allowed to cool to approximately room temperature. The balsa wood sample was then washed using water and methanol, then subjected to a final rinse with water. This resulted in a BWT. The BWT was soaked in a solution containing a PCM 140 (in this example, PEG 800) at various temperatures. As shown in FIG. 8, the PCM uptake was approximately 80% at about 140° F.

FIG. 9 illustrates PCM 140 retention in a BWT, according to some aspects of the present disclosure. PCM 140 retention is the amount of PCM 140 remaining in a wood template 125 compared to the initial amount of PCM 140 initially absorbed into the wood template 125. The PCM 140 retention appeared to be greater than 94% after about 50 hours. The xylan and/or lignin was removed using the same process as in FIG. 8. When looked at together, FIGS. 8 and 9 illustrate good uptake and retention of PCMs 140 by wood templates 125 that had xylan and/or lignin removed using the methods described herein.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A method of forming a wood template-supported phase change composite, the method comprising:
   extracting a xylan from a wood, resulting in a wood template;
   densifying at least a portion of the wood template; and
   inserting a phase change material into the wood template, wherein:
   the phase change material comprises a material that can absorb or release heat when changing phase, and
   the phase change material comprises polyethylene glycol and the stabilizing agent comprises poly(ethylene glycol) diacrylate.

2. The method of claim 1, wherein the extracting comprises:
   soaking at least a portion of the wood in a first solution;
   removing the wood from the first solution;
   applying a heat and a pressure to the wood; and
   washing the wood with a second solution.

3. The method of claim 2, wherein:
   the first solution comprises water, and
   the second solution comprises at least one of water or methanol.

4. The method of claim 2, wherein:
   the heat is in the range of about 100° F. to about 250° F.

5. The method of claim 4, wherein:
   the heat is in the range of about 140° F. to about 190° F.

6. The method of claim 1, wherein the densifying comprises:
   wetting at least a portion of the wood template, and
   compressing the wood template.

7. The method of claim 6, wherein the wetting comprises:
   soaking the at least a portion of the wood template in water.

8. The method of claim 6, wherein the compressing comprises:
   positioning a first plate on a first side of the wood template,
   positioning a second plate on a second side of the wood template, and
   applying a pressure the wood template through the first plate and the second plate.

9. The method of claim 8, wherein:
   the pressure comprises a displacement rate of approximately 1 mm/min.

10. The method of claim 1, wherein the inserting comprises:
    soaking the wood template in a solution comprising the phase change material and a stabilizing agent.

11. The method of claim 1, wherein:
    the phase change material and the stabilizing agent are cross-linkable.

12. The method of claim 1, wherein:
    the wood comprises at least one of pine, balsa, cedar, spruce, firwood, hemlock timber, teak wood, oak, maple, cherry, walnut, beech, mahogany, mango wood, sal wood, or ash.

13. The method of claim 1, further comprising:
    using the wood-template supported phase change composite for thermal energy storage.

14. A wood template-supported phase change composite device comprising:
    a wood template; and
    a phase change material and a stabilizing agent inserted in the wood template; wherein:
    the wood template comprises a wood that has had a xylan removed and at least a portion of the wood template is densified, and
    the phase change material comprises polyethylene glycol and the stabilizing agent comprises poly(ethylene glycol) diacrylate.

15. The device of claim 14, wherein:
    the phase change material comprises a material that can absorb or release heat when changing phase.

16. The device of claim 14, wherein:
    the phase change material and the stabilizing agent are cross-linkable.

17. The device of claim 14, wherein:
    the wood comprises at least one of pine, balsa, cedar, spruce, firwood, hemlock timber, teak wood, oak, maple, cherry, walnut, beech, mahogany, mango wood, sal wood, or ash.

\* \* \* \* \*